March 13, 1951     H. F. WORKS     2,545,331
DATA TRANSCRIBING APPARATUS
Filed Nov. 30, 1949     4 Sheets-Sheet 1
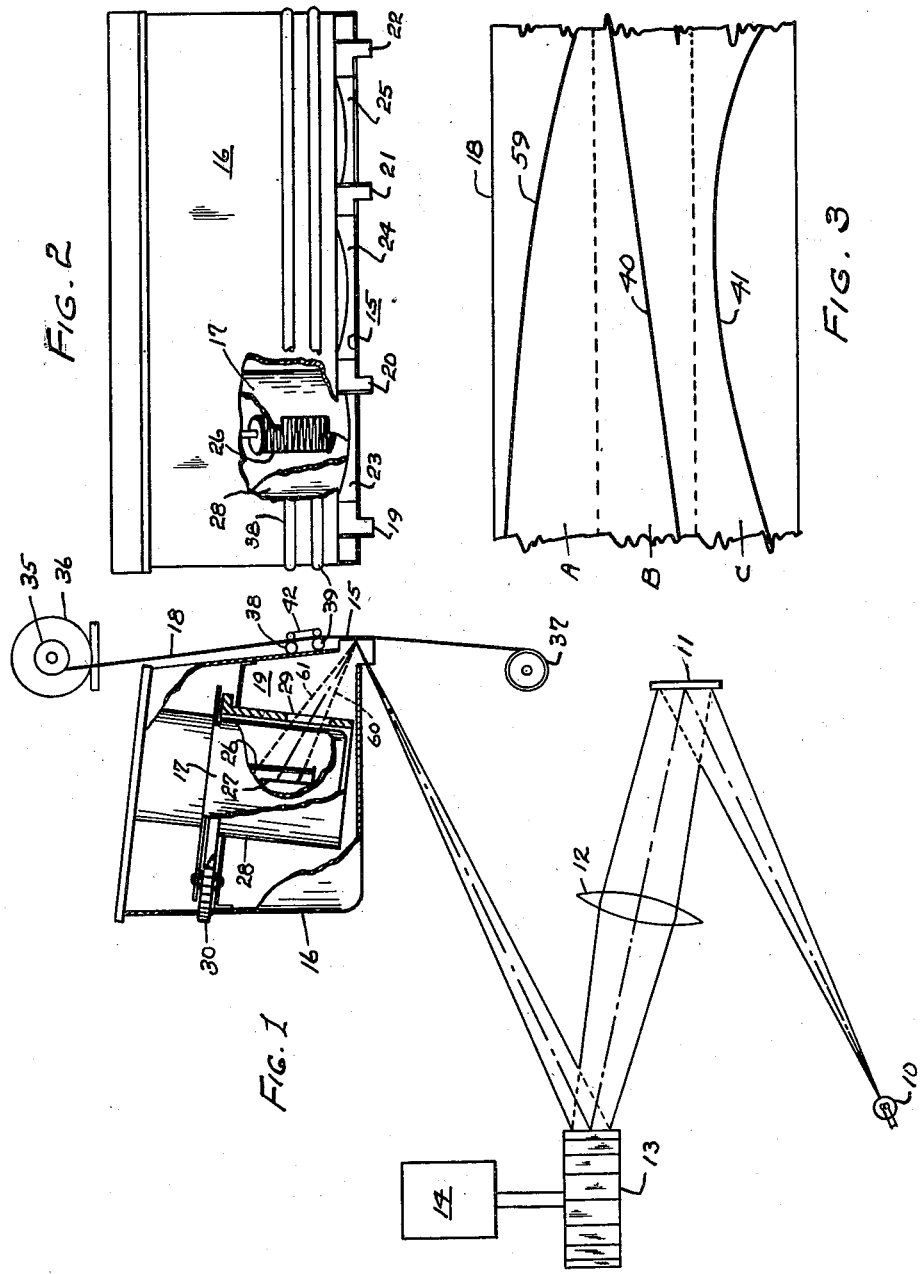
INVENTOR.
Herbert F. Works
BY Robert T. Palmer
Attorney March 13, 1951     H. F. WORKS     2,545,331
DATA TRANSCRIBING APPARATUS
Filed Nov. 30, 1949     4 Sheets-Sheet 2
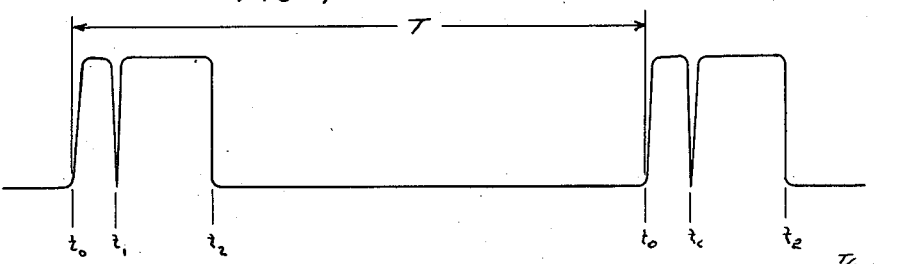
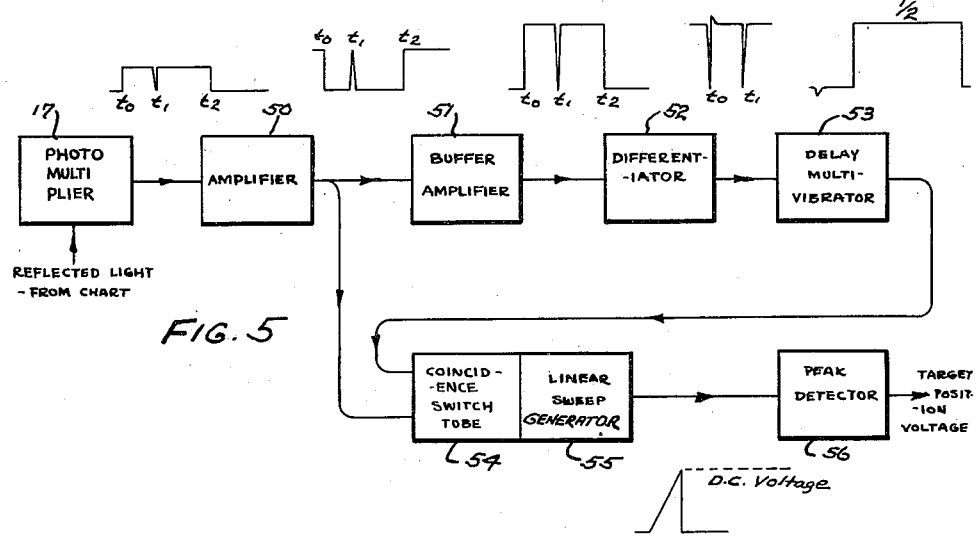
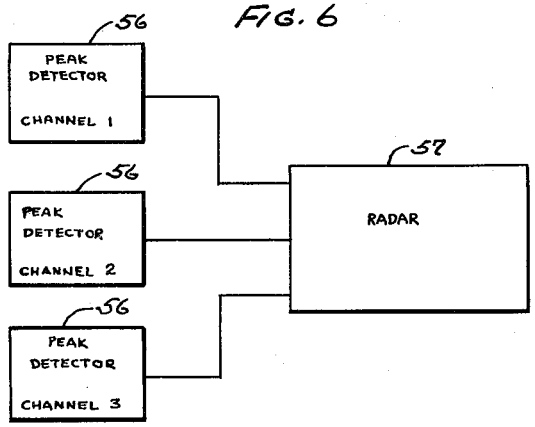
INVENTOR.
Herbert F. Works
BY Robert J. Palmer
Attorney

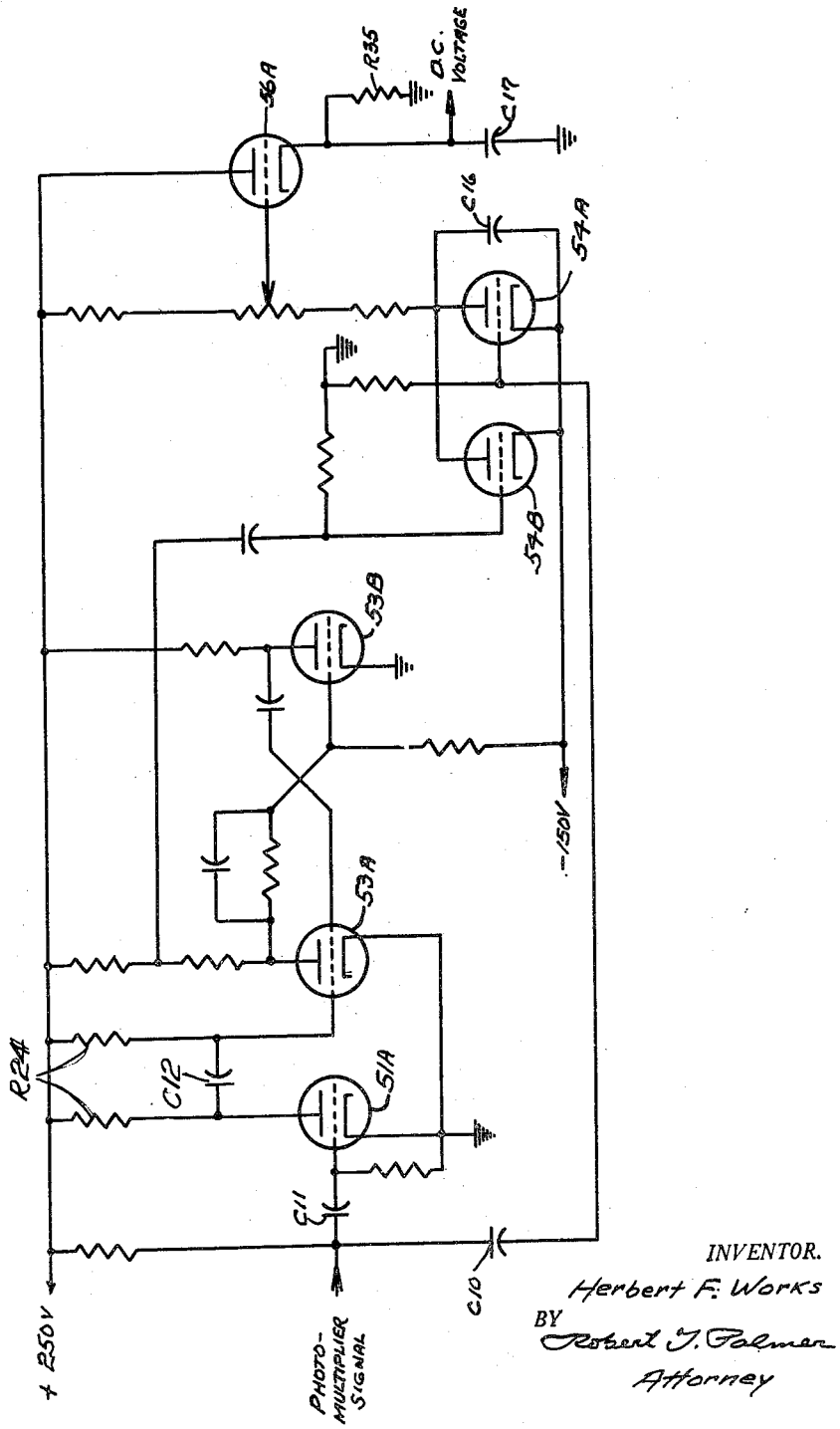

March 13, 1951  H. F. WORKS  2,545,331
DATA TRANSCRIBING APPARATUS

Filed Nov. 30, 1949  4 Sheets-Sheet 4

INVENTOR.
Herbert F. Works
BY
Robert J. Palmer
Attorney

Patented Mar. 13, 1951

2,545,331

UNITED STATES PATENT OFFICE 2,545,331

DATA TRANSCRIBING APPARATUS

Herbert F. Works, Millis, Mass., assignor to Transducer Corporation, Boston, Mass.

Application November 30, 1949, Serial No. 130,199

11 Claims. (Cl. 250—219)

This invention relates to apparatus for converting visible data recorded on a movable chart, into electrical voltages.

Facsimile apparatus can scan visible data recorded on a movable sheet, and reproduce this data, but requires another movable sheet synchronized with the sheet on which the data is recorded, for reproducing the recorded data, and its utility is limited to preparing images of the recorded data.

This invention provides apparatus which scans data recorded on a movable chart, but which instead of producing voltages which vary in accordance with fluctuations in light reflected from different portions of the recorded data, produces voltages which are proportional to the times required by the scanning beam to reach the outlines of the recorded data on successive sweeps.

Utilizing this invention, if it is desired to vary a voltage in a certain manner with respect to time, a chart is prepared on which a line is plotted with voltages as ordinates and time as abscissae. Then when at any subsequent time the chart is run through the scanning apparatus, an output voltage is obtained which varies in the desired manner. The chart may thus be used many times without any appreciable wear.

In one embodiment of the invention developed for training airplane gunners to locate, and sight on, targets by radar, the simulated target courses in azimuth, range and elevation are plotted in ink as separate, superimposed course lines in three separate channels, on a paper sheet. The sheet is scanned transversely by successive light beams reflected from a multimirror rotating at a rate to provide about 1,000 sweeps per second, as the sheet is moved longitudinally past the scanning apparatus.

A hood having three channels for reflected light corresponding to the channels on the sheet, and having a photo-electric cell in each channel, is located adjacent to the sheet, and has a slot therein facing, and disposed transversely of the sheet, the cells and the slot being so located that diffused reflected light from each channel on the sheet strikes the cathode of the corresponding cell. The slot contains spaced barrier strips which separate the three reflected light channels in the hood, and the end ones of which form the outer boundaries of the two outer reflected light channels. The leading barrier strip of each reflected light channel provides the base line for that channel.

A scanning spot of light leaves the leading barrier strip of a reflected light channel in the hood, and moves toward its trailing barrier strip, crossing the black, recorded line in this travel. Between the leading barrier strip and the line there is maximum reflection from the paper and the photo-electric cell for that channel generates maximum voltage. At the course line there is minimum reflection so that there the maximum voltage period ends since the photo-electric cell cathode generates little voltage, as the line is crossed by the light spot.

The voltages from the photo-electric cell are then passed through an amplifier, a buffer amplifier, a differentiator, a delay multi-vibrator, a coincidence tube, a linear sweep generator, and a peak detector, the latter producing a voltage which is proportional to the elapsed time between the start and the end of the generation of the maximum voltage by the photo-electric cell, and which is proportional to the distance between the leading barrier strip and the course line.

The direct current voltages emanating from the three channels are then compared in the radar's video equipment to voltages controlled by motions of the associated radar equipment, and the difference voltages are used for displacing a simulated target light spot on the screen of a cathode ray oscilloscope.

By providing the several channels on one sheet, the correct phase relationship of the data recorded thereon is simply and automatically maintained.

An object of this invention is to utilize recorded data for providing a voltage which varies with time.

Another object of this invention is to scan recorded data on a moving chart by a moving light spot in successive sweeps, and to provide a voltage which varies in accordance with the time required for the light spot to reach the recorded data following the start of each sweep.

Another object of this invention is to scan a plurality of channels each containing recorded data on a moving sheet, by a moving light spot in successive sweeps, and to provide a voltage for each channel which varies in accordance with the time required for the light spot to reach the recorded data in that channel following the start of each sweep.

The invention will now be described with reference to the drawing, of which:

Fig. 1 is a diagrammatic view of one embodiment of this invention;

Fig. 2 is a side elevation with a portion of the front wall removed, of the hood for the photoelectric cells;

Fig. 3 is a portion on a reduced scale, of a paper sheet used showing three typical course lines in three channels;

Fig. 4 is a chart showing the voltages resulting from a single sweep of one of the channels plotted against time;

Fig. 5 is a block diagram illustrating the equipment for providing voltages proportional to the times required for the spot of scanning light to reach a recorded course line following its appearance at the leading edge of a channel;

Fig. 6 is a block diagram illustrating the connections of the outputs of the video detectors for the three channels, to the associated radar video apparatus;

Fig. 7 is a circuit schematic illustrating in detail the circuit components of Fig. 5.

Figure 8:
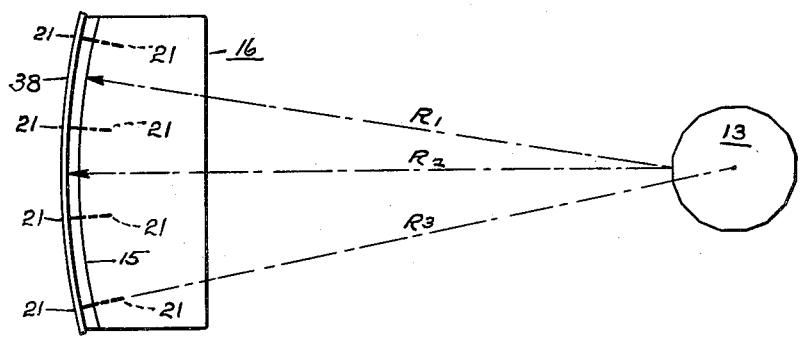
Fig. 8 is a partial plan view looking down on the mirror and hood used.

Referring first to Fig. 1 of the drawing, light from the source 10 is reflected by the fixed mirror 11 through the lens 12 onto the surfaces of the multi-mirror 13 which is rotated by the electric motor 14. The light reflected by the mirror 13 is projected through the slot 15 of the hood 16 enclosing the photo-electric cells 17, against the surface of the paper sheet 18 on which the course lines are recorded.

The slot 15 contains the four spaced barrier strips 19, 20, 21 and 22 which extend in radial lines $R_3$ (Fig. 8), from the center of the mirror 13 and which form the leading and trailing edges of the three channels 23, 24 and 25, in each of which is located a photo-electric cell 17. The strip 22 forms the leading edge and the base line for the channel 25. The strip 21 forms the trailing edge of the channel 25 and forms the leading edge and the base line of the channel 24. The strip 20 forms the trailing edge of the channel 24 and forms the leading edge and the base line of the channel 23. The strip 19 forms the trailing edge of the channel 23. The barrier strips converge inwardly from the slot 15 into the hood as illustrated by Fig. 8.

The photo-electric cells 17 employed are of the multiplier type and have the grids 26 before the light sensitive cathodes 27. The tubes are contained within the cylindrical shields 28 which have the openings 29 therein for receiving reflected light and which are rotatable by the intermeshed gears 30 for lining-up the openings 29 with the reflected light from the paper sheet 18, or for shielding the photo-electric cells from light.

The photo-electric cells 17 are so located within the hood 16 with respect to the slot 15 therein, the opening 29 in the shield 28, and the light beam from the multi-mirror 13, that the direct reflected light from the paper 18, illustrated by the heavy dashed line 60, of Fig. 1, strikes the lower edge of the cathode 27 so that the effective light on the cathode is the diffused reflected light from the paper between the lines 60 and 61. Many inks used for recording have glossy surfaces which substantially reflect light, so that by locating the photo-electric cells in the diffused reflected light, minimum light reflected from the recorded course lines reaches the cathodes of the photo-electric cells.

The paper sheet 18 is wound up on the roll 35 rotated by the electric motor 36, and is unrolled from the roll 37. The hood 16 has the spaced, curved guide rails 38 and 39 just above the slot 15 and which serve slidably to guide the sheet past the slot 15. The flat-wound coil spring 42 on the opposite side of the sheet 18 from the guide rails 38 and 39, causes the sheet to curve to follow the contour of the guide rails. The guide rails are curved in a circular arc having a radius $R_3$ (Fig. 8), about the adjacent reflecting surface of the multi-mirror. The slot 15 also extends in a circular arc having a radius $R_1$ (Fig. 8), about the adjacent reflecting surface of the mirror.

The sheet 18 has recorded thereon the elevation course line 59 in the channel A which corresponds to the channel 23 in the hood 16; has recorded thereon the range course line 40 in channel B which corresponds to the channel 24 in the hood 16; and has recorded thereon the azimuth course line 41 in the channel C which corresponds to the channel 25 in the hood 16.

In operation, the reflected light from the rotating multimirror 13 sweeps the face of the paper sheet 18 at a rate of about 1,000 sweeps per second. The diffuse reflection from the image spot as it transverses the sheet at the scanning line, is seen by the photo-electric cells in the reflected light channels in the hood 16.

Fig. 4 of the drawing shows an ideal plot of light flux versus time for one complete cycle and part of another cycle of a light spot in transversing one channel of the sheet, the channel C for example. The time $t_0$ is taken as that time at which the image spot leaves the leading edge of the leading barrier strip 22 of the channel 25 in the hood 16, and the time $t_1$ is that time at which the spot is eclipsed by the azimuth course line plotted in the channel C, and reflection is a minimum. The spot leaves the channel 25 at $t_2$ when it strikes the trailing edge barrier strip 21 of that channel. T is the time required for the cycle.

In the same way the time $t_0$ could be the time at which the image spot leaves the leading edge of the barrier strip 21 which is the leading barrier strip of the reflected light channel 24, and the time $t_1$ could be that time at which the spot is eclipsed by the range course line plotted in the channel B on the sheet 18, and the time $t_2$ could be the time at which the light spot leaves the channel 24 when it strikes the trailing barrier strip 20 of that channel.

In the same way the time $t_0$ could be the time at which the image spot leaves the leading edge of the barrier strip 20 which is the leading barrier strip of the reflected light channel 23, and the time $t_1$ could be that time at which the spot is eclipsed by the elevation course line plotted in the channel C on the sheet 18, and the time $t_2$ could be the time at which the light spot leaves the channel 23 when it strikes the trailing barrier strip 19 of that channel.

Referring now to Fig. 5 of the drawing, the output voltage of each photo-electric cell 17 is applied into the input of an amplifier 50, the amplified output of which is supplied into the input of a buffer amplifier 51, the output of which is supplied into the input of a differentiator 52, the output of which is supplied into the input of a delay multivibrator 53, the output of which is supplied into the input of a coincidence switch tube 54, which is connected to a linear sweep generator 55, the output of which is connected to the input of a peak detector 56. The output of the amplifier 50 is also supplied into the input of the coincidence switch tube 54.

The wave forms of the voltages at the output of each of the components of Fig. 5 are drawn in thereabove.

The amplifier 50 inverts and amplifies the voltages from the photo-electric cell, its negative output actuating the coincidence switch tube 54. The output of the amplifier 50 is inverted and amplified by the buffer amplifier 51. The differentiater 52 converts the output of the amplifier 51 into large negative triggers at $t_0$ and $t_1$. These operate the delay multivibrator which has a gate length of approximately T/2.

The inverted output of the amplifier 50 and the gate voltage from the multivibrator 53 are fed into the coincidence tube 54 whose output gates the linear sweep generator 55. When both inputs are negative, the sweep will be switched on. When either input is positive, the sweep is shut off. Thus the only period in which the sweep is generated is that time taken for the light spot to traverse the distance between the base line and the course line of a channel.

The sweep voltage is proportional to the sweep time so that the output of the peak detector is a direct current voltage which varies directly as the distance from a base line to a course line at different points along the length thereof.

The operation of the circuit of the block diagram of Fig. 5 will now be described with reference to Fig. 7. The photomultiplier signal, which has been inverted in the amplifier 50, is applied through a coupling capacitor C11 to the grid of the amplifier tube 51A and through a coupling capacitor C10, to the grid of the coincidence tube 54A. The amplifier tube 51A is used to raise the level of the input signal. The output signal from the tube 51A is differentiated and clipped in the coupling network C12, R24. The sharp negative pulse that is obtained from the normally-on section of the multivibrator comprising the tubes 53A and 53B (corresponding to the time duration $t_0$ to $t_1$), is applied to the coincidence switch tube 54B. The chart signal is applied to the other switch tube 54A. A charging capacitor, C16, is placed across the output of both of the switch tubes. For the time duration $t_0$ to $t_1$, or when both input signals to the switch tubes are negative, the tubes will be cut-off, thus permitting an exponential rise in voltage across C16. At the end of this period, the multivibrator pulse applied to the tubes will swing positive, thus discharging C16. The switch tube will be maintained in conducting condition by the inverted chart signal until the cycle is repeated, at time $t_0$ at which time it will be cut-off again. A sweep signal having a height proportional to the length of the gating signal will be obtained across C16. The sweep signal is applied to the peak detector 56A. The current pulse through this tube will have an amplitude proportional to the amplitude of the input sweep signal. The cathode RC circuit R35, C17 of the peak detector has a time constant long in comparison with the time between pulses. Therefore, over a period of several pulses, a direct current voltage will be obtained which will essentially follow the peak voltage of the linear sweep.

As illustrated by Fig. 6, the outputs of the three peak detectors 56, one for each channel, are supplied into the radar video 57 which is not described in detail herein since forming no part of the present invention.

While one embodiment of this invention has been described for the purpose of illustration, it should be understood that the invention is not limited to the exact apparatus and arrangement of apparatus illustrated, since modifications thereof may be suggested by those skilled in the art, without departure from the essence of the invention.

What I claim as my invention is:

1. In combination with a sheet having data recorded thereon, means for moving said sheet, means for scanning said sheet during its movement, in successive sweeps with a spot of light, a hood having a slot extending in the path of the light from said spot reflected from said sheet, a photo-electric cell in said hood having a light sensitive electrode in the path of the reflected light entering said slot, said cell generating a first voltage when the reflected light at the start of each sweep strikes said electrode, and generating a second voltage when the reflected light during each sweep, varied by the light spot contacting said data, strikes said electrode, and means connected to said cell for providing a direct current voltage which is proportional to the time interval between the generation of said first and second voltages.

2. The invention claimed in claim 1 in which the major surface of said electrode is out of the direct reflected light entering said slot whereby substantially all of the light striking said electrode is diffused reflected light.

3. In combination with a sheet having data recorded thereon, means for moving said sheet, means for scanning said sheet during its movement in successive sweeps with a spot of light, a hood having a slot extending in the path of the light from said spot reflected from said sheet, said slot having an edge at which reflected light at the start of each sweep enters, a photo-electric cell in said hood having a light sensitive electrode in the path of said reflected light, said cell generating a first voltage when the reflected light on each sweep enters said slot at said edge, and generating a second voltage when the reflected light on each sweep, varied by said spot contacting said data, enters said slot, and means connected to said cell for providing a direct current voltage which is proportional to the time interval between the generation of said first and second voltages.

4. The invention as claimed in claim 3 in which the major surface of said electrode is out of the path of the direct reflected light from said surface whereby substantially all of the light striking said electrode is diffused reflected light.

5. In combination with a sheet having spaced first and second data lines recorded longitudinally thereon, means for moving said sheet longitudinally, means for transversely scanning said sheet with a spot of light in successive sweeps during its movement, a hood having a slot extending transversely of said sheet in the path of the light from said spot reflected therefrom, said slot having means therein forming first and second channels, and a photo-electric cell in said hood in each of said channels, said first channel being positioned to receive reflected light from said spot in its movement across said first line, and said second channel being positioned to receive reflected light from said spot in its movement across said second line.

6. In combination with a sheet having spaced first and second data lines recorded longitudinally thereon, means for moving said sheet longitudinally, means for transversely scanning said sheet with a spot of light in successive sweeps during its movement, a hood having a slot extending transversely of said sheet in the path of the light reflected therefrom, said slot having a leading edge at which light reflected from said sheet enters therein, having a barrier strip spaced from said edge and forming the trailing edge of a first channel for reflected light and forming the light entering edge of a second channel for reflected light, a first photo-electric cell in said hood in said first channel, and a second photo-electric cell in said hood in said second channel, said first channel being positioned to receive reflected light from said spot in its movement across said first line, and said second channel being positioned to receive reflected light from said spot in its movement across said second line.

7. In combination with a sheet having a plurality of spaced data lines recorded longitudinally thereon, means for moving said sheet longitudinally, means for transversely scanning said sheet with a spot of light in successive sweeps, said means including a rotary multi-mirror, a hood having a slot extending transversely of said sheet in the path of the light reflected therefrom, said slot being formed in a circular arc having a center at substantially the nearest surface of said mirror, means in said hood comprising spaced barrier strips extending through said slots and forming a plurality of reflected light channels, one for each of said lines, said strips converging inwardly from said slot into said hood, and a photo-electric cell in each of said channels.

8. The invention claimed in claim 7 in which the hood has one or more guide members adjacent said slot and curved to conform therewith, and extending from said hood towards said sheet and serving to guide said sheet in its movement past said slot.

9. The invention claimed in claim 7 in which means is provided for curving said sheet concentric with said slot where it passes same in its movement.

10. The invention claimed in claim 9 in which one or more guides curved to conform with said slot, extend between same and said sheet where it passes same.

11. The invention claimed in claim 7 in which the strips extend in lines radial to said center.

HERBERT F. WORKS.

REFERENCES CITED

The following references are of record in the file of this patent:

UNITED STATES PATENTS

| Number | Name | Date |
|---|---|---|
| 2,458,926 | Bassett | Jan. 11, 1949 |
| 2,463,534 | Hawkins | Mar. 8, 1949 |